US010592492B2

(12) United States Patent
Dantale et al.

(10) Patent No.: US 10,592,492 B2
(45) Date of Patent: Mar. 17, 2020

(54) AUTOMATIC UPDATING OF OPERATIONAL TABLES

(71) Applicant: International Business Machines Corporation, Armonk, NY (US)

(72) Inventors: Vaibhav S. Dantale, Pune (IN); Samar T. Desai, Pune (IN)

(73) Assignee: International Business Machines Corporation, Armonk, NY (US)

(*) Notice: Subject to any disclaimer, the term of this patent is extended or adjusted under 35 U.S.C. 154(b) by 578 days.

(21) Appl. No.: 15/191,665

(22) Filed: Jun. 24, 2016

(65) Prior Publication Data

US 2017/0371908 A1    Dec. 28, 2017

(51) Int. Cl.
| G06Q 10/06 | (2012.01) |
| G06F 16/22 | (2019.01) |
| G06Q 50/06 | (2012.01) |
| G06F 16/24 | (2019.01) |
| G05B 19/418 | (2006.01) |

(52) U.S. Cl.
CPC ..... *G06F 16/2282* (2019.01); *G05B 19/4183* (2013.01); *G06F 16/2228* (2019.01); *G06F 16/24* (2019.01); *G06Q 10/06393* (2013.01); *G06Q 50/06* (2013.01); *G05B 2219/32196* (2013.01); *Y02P 90/10* (2015.11); *Y02P 90/18* (2015.11); *Y02P 90/22* (2015.11)

(58) Field of Classification Search
CPC .......... G06Q 10/10; G05B 2219/25057; G06F 17/30575

See application file for complete search history.

(56) References Cited

U.S. PATENT DOCUMENTS

| 5,675,784 | A | * | 10/1997 | Maxwell | ................. G06Q 10/10 |
| 6,487,457 | B1 | * | 11/2002 | Hull | ....................... G05B 15/02 |
| | | | | | 700/17 |
| 6,591,275 | B1 | | 7/2003 | Russell et al. | |
| 8,868,483 | B2 | | 10/2014 | Golani et al. | |
| 9,043,278 | B1 | * | 5/2015 | Wilson | .................... G06F 16/27 |
| | | | | | 707/626 |
| 9,652,339 | B2 | | 5/2017 | Markus | |
| 10,228,837 | B2 | | 3/2019 | Hua | |
| 2006/0106832 | A1 | * | 5/2006 | Ben-Dyke | ........... G06F 16/2246 |
| 2012/0246190 | A1 | * | 9/2012 | Surtani | ................... G06F 16/27 |
| | | | | | 707/769 |

(Continued)

*Primary Examiner* — Renae Feacher
(74) *Attorney, Agent, or Firm* — William H. Hartwell; Alexander G. Jochym; Adolph Bohnstedt

(57) ABSTRACT

One or more processors receive operational data. The operational data includes two or more fields that contain an identical type of data as two or more fields within a master table. One or more processors generate a plurality of first unique identifiers from the two or more fields within the operational data and the master table. One or more processors determine a match between a pair of the plurality of first unique identifiers. The match is between a first unique identifier included in a operational data record and a first unique identifier included in a master table record. One or more processors determine a second unique identifier from the master table record. One or more processors generate an operational table record that includes the second unique identifier and at least a portion of the operational data.

18 Claims, 4 Drawing Sheets

(56) References Cited

U.S. PATENT DOCUMENTS

| | | | |
|---|---|---|---|
| 2012/0317259 A1* | 12/2012 | Shikano | H04L 12/6418 709/223 |
| 2014/0074409 A1* | 3/2014 | Boyd | G06F 11/3013 702/35 |
| 2014/0195494 A1* | 7/2014 | Guru | G06F 16/215 707/692 |
| 2014/0317093 A1* | 10/2014 | Sun | G06F 16/2255 707/722 |
| 2017/0242881 A1 | 8/2017 | Northfleet | |

* cited by examiner

| turbine_id | plant_id | location_id | param1 | param2 |
|---|---|---|---|---|
| turb58 | Burlington | Vt08 | ............... | ............... |
| turb15 | Plattsburgh | NY10 | ............... | ............... |

FIG. 3A

| uniqid | turbine_id | plant_id | location_id | other details |
|---|---|---|---|---|
| 8g5sgwte | turb58 | Burlington | Vt08 | ............... |
| 9l7qfowa | turb06 | Peru | NY10 | ............... |
| 4l0sdyqz | turb15 | Plattsburgh | NY10 | ............... |
| 9h2oarej | turb10 | Endicott | NY05 | ............... |
| 8g6yakqy | turb15 | Newport | Vt04 | ............... |
| 9h4pqbdy | turb12 | Burlington | Vt08 | ............... |
| 5k2uhqks | turb10 | Sherbrooke | Qc01 | ............... |

FIG. 3B

| uniqid | timestamp | param1 | param2 |
|---|---|---|---|
| 8g5sgwte | 3:43_160216 | ............... | ............... |
| 4l0sdyqz | 3:43_160216 | ............... | ............... |

FIG. 3C

AUTOMATIC UPDATING OF OPERATIONAL TABLES

BACKGROUND OF THE INVENTION

The present invention relates generally to the field of operational data collecting, and more particularly to the automatic, real-time retrieval of unique identifiers from a master table for insertion into operational tables.

Operational data from industrial processes and machines (data sources) is constantly acquired and stored in operational tables linked to master tables. The data stored in operational tables requires additional identification data that is stored in the master tables.

SUMMARY

Embodiments of the present invention provide a method, system, and program product to automatically update operational tables. One or more processors receive operational data, wherein the operational data includes two or more fields that contain an identical type of data as two or more fields within a master table. One or more processors generate a plurality of first unique identifiers from the two or more fields within the operational data and the master table. One or more processors determine a match between a pair of the plurality of first unique identifiers, wherein the match is between a first unique identifier included in a operational data record and a first unique identifier included in a master table record. One or more processors determine a second unique identifier from the master table record. One or more processors generate an operational table record that includes the second unique identifier and at least a portion of the operational data.

BRIEF DESCRIPTION OF THE SEVERAL VIEWS OF THE DRAWINGS

FIG. 3A-C respectively illustrate examples of i) a portion of operational data file, ii) a portion of a master table, and iii) a portion of an updated operational table, on a computing device within the environment of FIG. 1, in accordance with an exemplary embodiment of the present invention.

DETAILED DESCRIPTION

Many industrial processes generate operational data as operational data files. The operational data files are read by a client workstation to obtain operational data. The operational data within the operational data files consequently needs to be inserted by the client workstation into an operational table on a server in order to update the operational table with the most recent data regarding the industrial process. Typically, the operational table is linked to a master table on the server that includes data such as a unique identifier associated with the machine or process that is generating the operational data file. The unique identifier must be included with the operational data in order for the operational data to be inserted into the operational table. However, the operational data typically does not contain the unique identifier that identifies the machine or process that is generating the operational data.

It is typically the case that several steps are required in order for the client workstation to update the server operational table with the operational data. First, a client application such as an operational historian must map the operational data with the server master table. Second, the application must fetch the unique identifier associated with the machine or process from the server master table. Third, the application must update an operational record by adding the unique identifier and the operational data to the operational record. Finally, the application must insert the updated record into the server operational table. These steps involve multiple communication exchanges between the client application and the server that unnecessarily consume network bandwidth and central processing unit (CPU) cycles on both the client workstation and the server.

Embodiments of the present invention recognize that updating an operational table with operational data is often a complex process that hinders process development and demands significant computing resources. Embodiments of the present invention provide an automatic update operation on servers that avoids the current back-and-forth communication between clients and servers, thereby saving network bandwidth and CPU cycles. Thus, embodiments of the present invention provide a method for automatic updating of operational tables on servers with operational data in order to facilitate process development and decrease demand on computing resources.

The present invention will now be described in detail with reference to the Figures.

Figure 1:
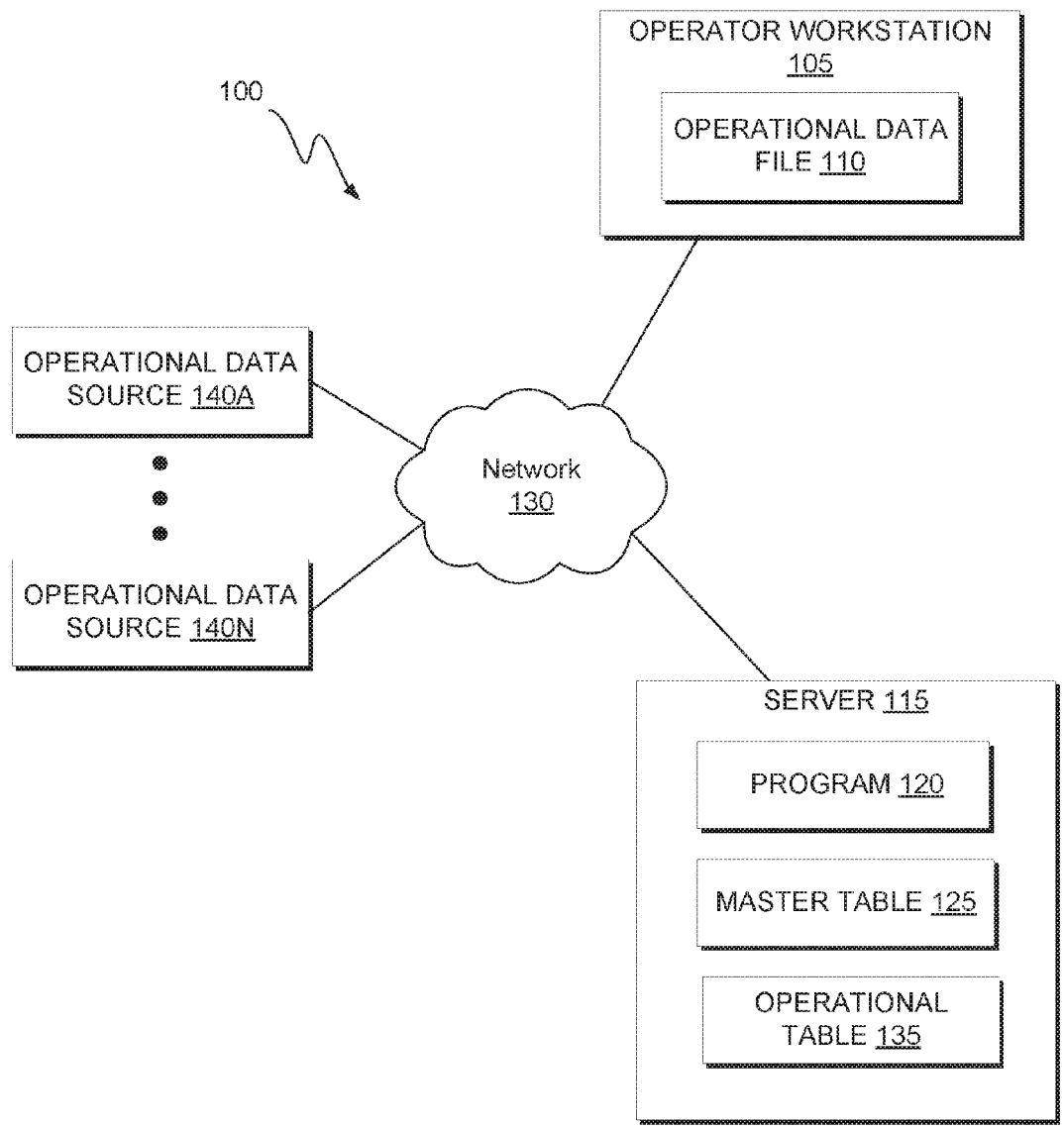
FIG. 1 is a functional block diagram illustrating an operational data acquisition environment, in accordance with an exemplary embodiment of the present invention.

FIG. 1 is a functional block diagram illustrating an operational data acquisition environment, generally designated 100, in accordance with one embodiment of the present invention. Operational data acquisition environment 100 includes operator workstation 105, server 115, and a plurality of operational data sources illustrated as operational data sources 140A through 140N, all connected over network 130. Operator workstation 105 includes operational data file 110. Server 115 includes program 120, master table 125, and operational table 135.

In various embodiments of the present invention, operator workstation 105 and server 115 are computing devices that can be standalone devices, servers, laptop computers, tablet computers, netbook computers, personal computers (PCs), or desktop computers. In another embodiment, operator workstation 105 and server 115 represent a computing system utilizing clustered computers and components to act as a single pool of seamless resources. In general, operator workstation 105 and server 115 can be any computing devices or a combination of devices with access to operational data sources 140A-140N, operational data file 110, master table 125, and operational table 135, and are capable of executing program 120. Operator workstation 105 and server 115 may include internal and external hardware components, as depicted and described in further detail with respect to FIG. 4.

In this exemplary embodiment, operational data file 110 is stored on operator workstation 105 and program 120, master table 125, and operational table 135 are stored on server 115. However, in other embodiments, operational data file 110, program 120, master table 125, and operational table 135 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between operator workstation 105 (including operational data file 110), server 115 (including program 120, master table 125, and operational table 135), and operational data sources 140A-140N, in accordance with a desired embodiment of the present invention.

In exemplary embodiments, operational data file 110 is a data file containing operational data from one or more operational data sources such as operational data sources 140A-140N. The operational data obtained from operational data sources 140A-140N contains recent data concerning, for example, machines and processes that are operating in an industrial setting. In some embodiments, operational data sources 140A-140N are data sources providing operational data files detailing recent performance parameters from machines and processes operating in an energy industry, e.g., solar energy, thermal energy, power grids, wind farms, etc. It should be understood, however, that embodiments of the present invention apply to many other industrial processes, machines, etc. where operational data is routinely collected and stored in operational tables linked to master tables. For example, industrial control systems (ICS) such as supervisory control and data acquisition (SCADA) systems provide settings wherein embodiments of the present invention find utility.

In exemplary embodiments, program 120 automatically updates operational table 135 with operational data from operational data file 110. In various embodiments program 120 provides a "HASHREFERENCE" definition for master table 125 and operational table 135. Program 120 provides the logic to transform the operational data from operational data file 110 so that operational table 135 is automatically updated per the HASHREFERENCE definition. In various embodiments, program 120 accommodates the inclusion or deletion of fields in the operational data within operational data file 110 as well as the inclusion or deletion of fields within master table 125 and operational table 135 by allowing modifications to be made to the HASHREFERENCE definition. In these scenarios, the introduction of a new field or deletion of a pre-existing field in the master table and operational data only requires the inclusion or deletion, respectively, of the corresponding field in the HASHREFERENCE definition.

In exemplary embodiments, master table 125 contains data about industrial machines and processes that includes a unique identifier for each machine or process being monitored by a user of operator workstation 105. Thus, the user of operator workstation 105 receives operational data from operational data sources 140A-140N in the form of one or more operational data files such as operational data file 110. The operational data from the one or more operational data files is read and sent to server 115. The unique identifier for each machine or process associated with the operational data is automatically extracted from master table 125 by program 120 and used to update operational table 135 with the operational data.

In exemplary embodiments, operational table 135 includes operational data and unique identifiers associated with industrial machines and processes. In various embodiments, the operational data contained in operational table 135 includes time-based process data that allows trends and historical information about processes and machines to be analyzed. In some embodiments, the operational data within operational table 135 captures industrial plant management information about production status, performance monitoring, quality assurance, tracking and genealogy, product delivery, etc.

Figure 2:
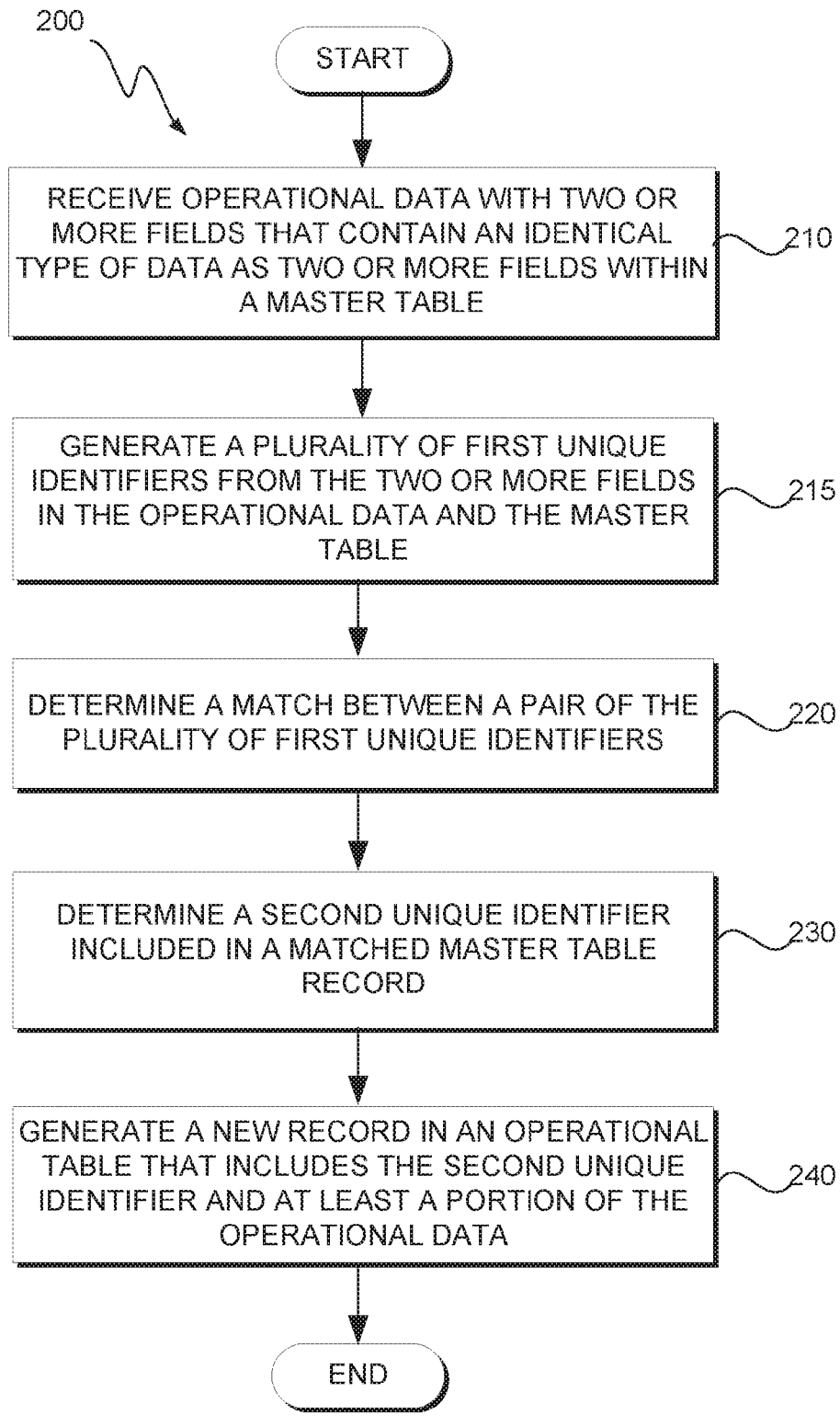
FIG. 2 illustrates operational processes for automatically combining a group of fields in operational data to create a first unique identifier in order to retrieve a second unique identifier from a master table, on a computing device within the environment of FIG. 1, in accordance with an exemplary embodiment of the present invention.

FIG. 2 illustrates operational processes, generally designated 200, for automatically combining a group of fields in operational data to create a first unique identifier in order to retrieve a second unique identifier from master table 125, on server 115 within the environment of FIG. 1, in accordance with an exemplary embodiment of the present invention. The operational processes illustrated in FIG. 2 circumvent a series of typical back and forth communication exchanges between operator workstation 105 and server 115 that unnecessarily consume network bandwidth and CPU cycles.

In step 210, program 120 receives operational data that was read by operator workstation 105 from operational data file 110. In various embodiments, the operational data includes two or more fields that contain an identical type of data as the same number of fields in master table 125. For example, if the two or more fields for the operational data include a field that indicates an identifier and a field that indicates a location of a machine or process, then the two or more fields in master table 125 will also include a field that indicates an identifier and a field that indicates a location of a machine or process.

In step 215, program 120 generates a plurality of first unique identifiers from the two or more fields in the operational data and master table 125. In various embodiments, the two or more fields are combined to generate the first unique identifier for each record in the operational data and each record in the master table. In these embodiments, the two or more fields, when combined, generate an identifier that is unique because the two or more fields contain information such as i) a local identity of a machine or process and ii) a location of the machine or process. Thus, the combination of the two or more fields provides a unique "fingerprint" associated with the machine or process.

In step 220, program 120 determines a match between a pair of the plurality of first unique identifiers. In various embodiments and scenarios, the match is between a first unique identifier in an operational data record and a first unique identifier in a master table 125 record. The match between the pair of first unique identifiers indicates that the machine or process associated with the matched operational data record is the same machine or process that is associated with the matched master table 125 record.

In step 230, program 120 determines a second unique identifier included in the matched master table 125 record. In various embodiments and scenarios, the determined second unique identifier is in a field that is not included in the two or more master table fields that were combined to generate the first unique identifiers. In various embodiments, the second unique identifier is an identifier assigned to machine or process when the master table data associated with the machine or process was originally input into master table 125.

In step 240, program 120 automatically generates a new record in operational table 135 containing at least a portion of the operational data that was received from operator workstation 105 in step 210 as well as the second unique identifier that was determined in step 230.

FIGS. 3A-C respectively illustrate examples of i) a portion of operational data from an operational data file, ii) a portion of a master table, and iii) a portion of an updated operational table, on a computing device within the environment of FIG. 1, in accordance with an exemplary embodiment of the present invention. The examples depicted in FIGS. 3A-C are illustrative only. They are not intended to limit the scope of embodiments of the present invention.

FIG. 3A is an example of operational data associated with a wind farm. In the field "turbine_id" there are two local identifiers for turbines: "turb58" and "turb15." The two turbines are each associated with a plant identifier (i.e., "Burlington" and "Plattsburgh") and a location identifier (i.e., "Vt08" and "NY10"). Thus, turb58 is a local identifier of a wind turbine associated with a turbine plant in Burlington and a location of Vt08. Likewise, turb15 is a local identifier of a wind turbine associated with a turbine plant in Plattsburgh and a location of NY10. "Param1" and "param2" are operational data such as power output, rotational speed, time of last maintenance, etc. For reasons of clarity, data is not included in these fields since none is needed in the illustrative examples depicted by FIGS. 3A-C.

FIG. 3B is an example of a portion of a master table such as master table 125. Shown in FIG. 3B are four data-filled fields: "uniqid," "turbine_id," "plant_id," and "location_id." The "other details" column is present to indicate that other data is often included in a master table such as master table 125. For reasons of clarity, data is not included in the "other details" field since none is needed in the illustrative examples depicted by FIGS. 3A-C.

Note that three of the four data-filled fields in the illustrative master table portion of FIG. 3B have identical headers as the three data-filled fields in FIG. 3A. In both the operational data of FIG. 3A and the portion of the master table in FIG. 3B, the fields "turbine_id," "plant_id," and "location_id" hold the same types of data. Program 120 combines the three types of data to form a unique identifier for all of the turbines in FIG. 3A and FIG. 3B. Thus, program 120 executes a command such as: HASHREFERENCE FOR MASTER_DATA (turbine_id,plant_id,location_id) REFERRING uniqid. This command triggers the generation of a unique identifier such as "turb58BurlingtonVt08" for the first record in the operational data of FIG. 3A and "turb15PlattsburghNY10" for the second record in the operational data of FIG. 3A. Program 120 then combines the fields "turbine_id," "plant_id," and "location_id" in the portion of the master table in FIG. 3B and searches those combinations for matches to "turb58BurlingtonVt08" and "turb15PlattsburghNY10." Once matches have been found by program 120 in the combined fields of the portion of the master table in FIG. 3B, program 120 reads the unique identifier under "uniqid" of the matching records in the portion of the master table in FIG. 3B. The unique identifiers under "uniqid" are the "true" unique identifiers for the turbines included in the portion of the master table in FIG. 3B. These "true" unique identifiers (i.e., the identifiers in the "uniqid" column of the portion of the master table) are identifiers uniquely assigned to each turbine in the master table and are required in order to update the portion of an operational table depicted in FIG. 3C. After program 120 has read the unique identifiers under "uniqid" for the matching records, program 120 writes the unique identifiers to the operational table (i.e., operational table 135) along with a timestamp in order to update the operational table as illustrated in FIG. 3C FIG. 3C illustrates a portion of an operational table such as operational table 135 after the process is finished. Program 120 automatically takes the operational data record from FIG. 3A containing "turb58," "Burlington," and "Vt08" and generates the record containing "8g5sgwte" with the timestamp "3:43_160216" in the portion of the operational table shown in FIG. 3C. By combining the "turbine_id," "plant_id," and "location_id" fields in the record for "turb58" in the FIG. 3A operational data and finding a match by combining the same fields in the FIG. 3B master table portion, program 120 determines that "8g5sgwte" is the "uniqid" from the FIG. 3B master table portion corresponding to the "turb58" record in the FIG. 3A operational data. Likewise, program 120 automatically takes the operational data record from FIG. 3A containing "turb15," "Plattsburgh," and "NY10" and generates the record containing "410sdyqz" with the timestamp "3:43_160216" in the portion of the operational table shown in FIG. 3C by the identical process.

Figure 4:
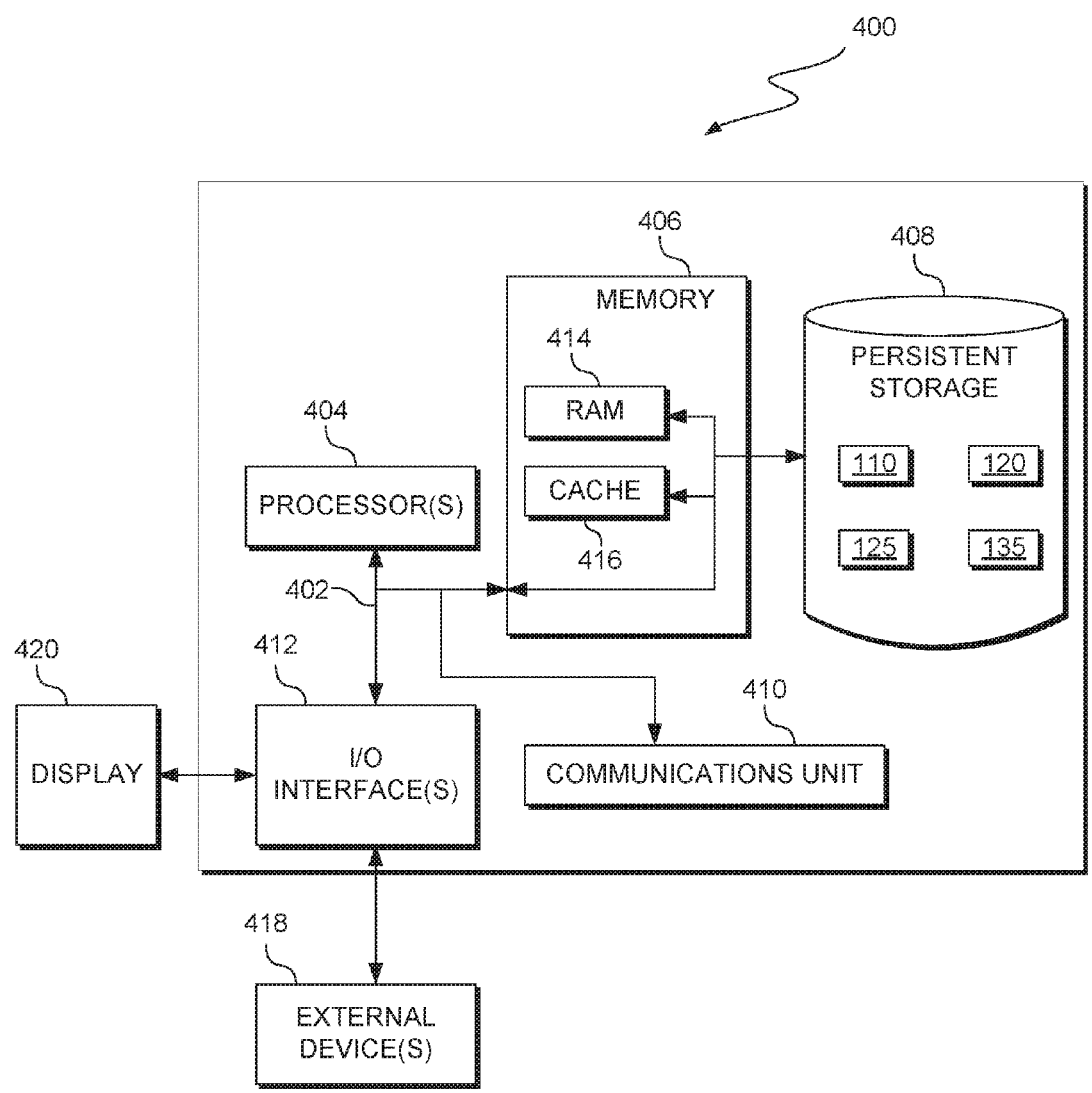
FIG. 4 depicts a block diagram of components of a computing device within the environment of FIG. 1 executing a program, in accordance with an exemplary embodiment of the present invention.

FIG. 4 depicts a block diagram, 400, of components of operator workstation 105 and server 115, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Operator workstation 105 and server 115 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Operational data file 110, program 120, master table 125, and operational table 135 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. Operational data file 110, program 120, master table 125, and operational table 135 may be downloaded to persistent storage 408 through communications unit 410.

I/O interface(s) 412 allows for input and output of data with other devices that may be connected to operator workstation 105 and server 115. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., operational data file 110, program 120, master table 125, and operational table 135, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   receiving, by one or more processors, operational data, wherein the operational data includes two or more fields that contain an identical type of data as two or more fields within a master table;
   generating, by the one or more processors, a plurality of first unique identifiers from the two or more fields within the operational data and the master table;
   determining, by the one or more processors, a match between a pair of the plurality of first unique identifiers, wherein the match is between a first unique identifier included in a operational data record and a first unique identifier included in a master table record;
   determining, by the one or more processors, a second unique identifier from the master table record, wherein determining the second unique identifier includes identifying the second unique identifier is in a field that is not included in the two or more master table fields that were combined to generate the first unique identifiers; and
   generating, by the one or more processors, an operational table record based, at least in part, on the match between the pair of the plurality of first unique identifiers from the operational data record and the master table record, wherein the operational table record includes the second unique identifier for the matched pair of the plurality of first unique identifiers, one or more performance parameters and a timestamp.

2. The method of claim 1, wherein the two or more fields include one or both of: i) a local identity of a machine and ii) a location of a machine.

3. The method of claim 1, wherein the step of generating, by the one or more processors, the plurality of first unique identifiers from the two or more fields within the operational data and the master table further comprises:
   generating, by the one or more processors, the plurality of first unique identifiers from the two or more fields within the operational data and the master table by combining the two or more fields within the operational data and the master table.

4. The method of claim 1, wherein the operational data includes one or more performance parameters from one or both of: i) one or more industrial machines and ii) one or more industrial processes.

5. The method of claim 1, wherein the operational data includes one or more of: i) solar energy data, ii) thermal energy data, iii) power grid data, and iv) wind farm data.

6. The method of claim 1, wherein the operational data includes captured industrial plant management information for one or more of: i) production status, ii) performance monitoring, iii) quality assurance, iv) tracking and genealogy, and v) product delivery.

7. A computer program product comprising:
   one or more computer-readable storage media and program instructions stored on at least one of the one or more computer-readable storage media, the program instructions comprising:
   program instructions to receive operational data, wherein the operational data includes two or more fields that contain an identical type of data as two or more fields within a master table;
   program instructions to generate a plurality of first unique identifiers from the two or more fields within the operational data and the master table;
   program instructions to determine a match between a pair of the plurality of first unique identifiers, wherein the match is between a first unique identifier included in a operational data record and a first unique identifier included in a master table record;
   program instructions to determine a second unique identifier from the master table record, wherein determining includes identifying the second unique identifier is in a field that is not included in the two or more master table fields that were combined to generate the first unique identifiers; and
   program instructions to generate an operational table record based, at least in part, on the match between the pair of the plurality of first unique identifiers from the operational data record and the master table record, wherein the operational table record includes the second unique identifier for the matched pair of the plurality of first unique identifiers, one or more performance parameters and a timestamp.

8. The computer program product of claim 7, wherein the two or more fields include one or both of: i) a local identity of a machine and ii) a location of a machine.

9. The computer program product of claim 7, wherein the program instructions to generate the plurality of first unique identifiers from the two or more fields within the operational data and the master table further comprises:
   program instructions to generate the plurality of first unique identifiers from the two or more fields within the operational data and the master table by combining the two or more fields within the operational data and the master table.

10. The computer program product of claim 7, wherein the operational data includes one or more performance parameters from one or both of: i) one or more industrial machines and ii) one or more industrial processes.

11. The computer program product of claim 7, wherein the operational data includes one or more of: i) solar energy data, ii) thermal energy data, iii) power grid data, and iv) wind farm data.

12. The computer program product of claim 7, wherein the operational data includes captured industrial plant management information for one or more of: i) production status, ii) performance monitoring, iii) quality assurance, iv) tracking and genealogy, and v) product delivery.

13. A computer system comprising:
one or more computer processors;
one or more computer-readable storage media; and
program instructions stored on at least one of the one or more computer-readable storage media for execution by at least one of the one or more processors, the program instructions comprising:
program instructions to receive operational data, wherein the operational data includes two or more fields that contain an identical type of data as two or more fields within a master table;
program instructions to generate a plurality of first unique identifiers from the two or more fields within the operational data and the master table;
program instructions to determine a match between a pair of the plurality of first unique identifiers, wherein the match is between a first unique identifier included in a operational data record and a first unique identifier included in a master table record;
program instructions to determine a second unique identifier from the master table record, wherein determining includes identifying the second unique identifier is in a field that is not included in the two or more master table fields that were combined to generate the first unique identifiers; and
program instructions to generate an operational table record based, at least in part, on the match between the pair of the plurality of first unique identifiers from the operational data record and the master table record, wherein the operational table record includes the second unique identifier for the matched pair of the plurality of first unique identifiers, one or more performance parameters and a timestamp.

14. The computer system of claim 13, wherein the two or more fields include one or both of: i) a local identity of a machine and ii) a location of a machine.

15. The computer system of claim 13, wherein the program instructions to generate the plurality of first unique identifiers from the two or more fields within the operational data and the master table further comprises:
program instructions to generate the plurality of first unique identifiers from the two or more fields within the operational data and the master table by combining the two or more fields within the operational data and the master table.

16. The computer system of claim 13, wherein the operational data includes one or more performance parameters from one or both of: i) one or more industrial machines and ii) one or more industrial processes.

17. The computer system of claim 13, wherein the operational data includes one or more of: i) solar energy data, ii) thermal energy data, iii) power grid data, and iv) wind farm data.

18. The computer system of claim 13, wherein the operational data includes captured industrial plant management information for one or more of: i) production status, ii) performance monitoring, iii) quality assurance, iv) tracking and genealogy, and v) product delivery.

* * * * *